INVENTOR.
CHARLES EDWARD De YOUNG
IRVINE E. GANDEE
BY
ATTORNEY

INVENTOR.
CHARLES EDWARD De YOUNG
IRVINE E. GANDEE
BY
Arthur L Wade
ATTORNEY

# United States Patent Office 3,265,080
Patented August 9, 1966

3,265,080
LIQUID DISTRIBUTION METHOD
Charles Edward de Young, Houston, Tex., and Irvine E. Gandee, Tulsa, Okla., assignors to National Tank Company, Tulsa, Okla., a corporation of Nevada
Application Sept. 24, 1962, Ser. No. 226,483, now Patent No. 3,202,167, dated Aug. 24, 1965, which is in turn a continuation of application Ser. No. 26,140, filed May 2, 1960. Divided and this application Mar. 1, 1965, Ser. No. 435,859
4 Claims. (Cl. 137—12)

This application is a division of our pending application S.N. 226,483, filed September 24, 1962, now Patent 3,202,167, which was a continuation of our application S.N. 26,140, filed May 2, 1960, now abandoned.

The present invention relates to collecting, and redistributing, liquid. More specifically, the invention relates to collecting oil well production from a plurality of locations and dividing its processing among a series of treaters.

One of the most critical problems today, of gathering systems in the oil fields, is that of distributing the liquids gathered to a plurality of processing units, any one of which does not have sufficient capacity to handle the total amount of liquids to be processed. When conservation regulations of an oil producing locality limit the performance of individual wells, it is economically desirable to centralize the production of a number of these wells for processing their liquids. A number of treaters may be required to handle this collection. On the other hand, when production from a well of high capacity is not limited by local regulations on production, the quantity of production gathered for processing may exceed the capacity of individual treaters available. In either situation, there exists the problem of distributing the total liquids, as pre-determined proportionate shares, to a number of treaters. In general, the control of this quantity of production to each treater must be maintained over a range of variation in such a way as to avoid overloading one or more treaters while underloading the remaining treaters.

A principal object of the invention is to maintain division of a total quantity of liquids by the use of weirs uniformly related to the supply of the liquids.

Another object is to maintain division of each of the upper strata of the phases of a total quantity of liquids by the use of weirs uniformly related to the strata.

Another object is to maintain a homogeneous mixture of a plurality of liquids and equally relate weirs to the total quantity of liquids in dividing the total into predetermined proportionate shares.

Another object is to control the discharge of liquid which has been divided from the total collection by each weir to maintain a minimum collection of the divided liquid as a seal against gas flow from above the liquid to the withdrawal point of the collection.

Another object is to control the total amount of liquid brought to the collecting body of such liquid, to be metered, in accordance with the quantity of liquid in the collection which has been metered over each weir.

Another object is to apply a common gas pressure to the surface of all collections of liquid to be metered and which have been metered by the several weirs.

The present invention contemplates a single vessel into which liquids from oil wells are collected for distribution to a number of processing units. The level of liquids of the common collection is raised uniformly to a plurality of weirs having predetermined heights. The liquids are metered by passing over these weirs and forming separate collections within individual compartments within the vessel. The metered liquids are then withdrawn from the various compartments of the vessel to processing units, such as treaters.

The invention further contemplates the liquid phases brought into the vessel being allowed to form strata and the upper strata raised uniformly to the plurality of weirs.

The invention further contemplates the liquids brought into the vessel being maintained in a homogeneous mixture as their level is raised uniformly to the plurality of weirs.

The invention further contemplates that each weir compartment will have a provision for detecting a maximum level of the liquids and initiating action to limit the total input of liquids to the vessel.

Finally, the invention contemplates an internal arrangement of the vessel in which the liquids metered into each weir compartment, and the common collection to be distributed, are exposed to a common, controlled, gas pressure within the vessel.

Other objects, advantages and features of this invention will become apparent to one skilled in the art upon consideration of the written specification, appended claims, and attached drawings, wherein;

Figure 1:
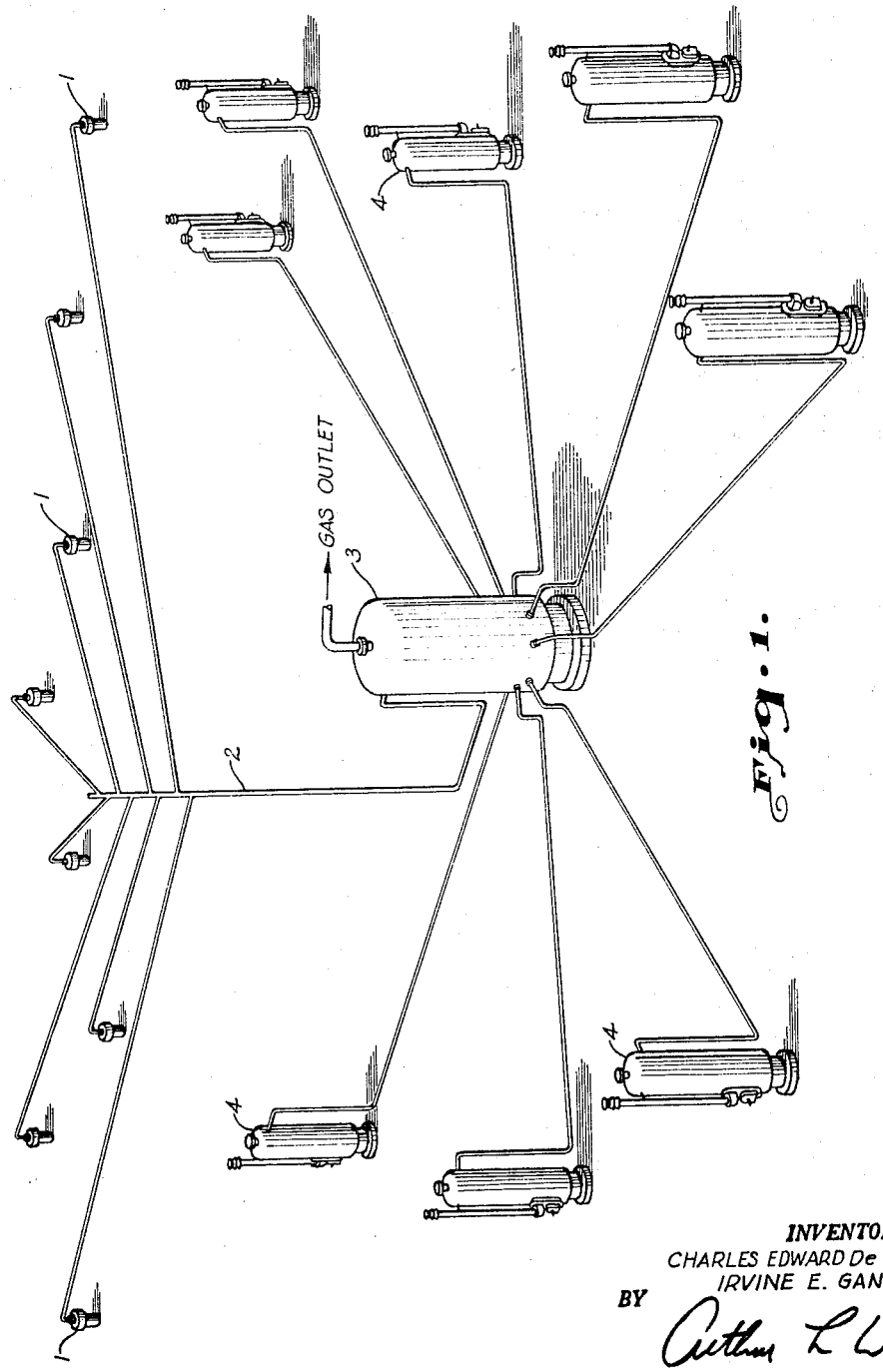
FIG. 1 is a diagrammatic representation of several sources of oil well production, the total production being distributed to a number of treaters by apparatus in which the present invention is embodied.

FIG. 1 illustrates the overall environment of the present invention. The wellheads of several oil wells 1 are indicated, producing liquids and gas which require field processing prior to their delivery to pipelines of purchasers. These wells simply represent one type of source for liquids to be divided. The various wells 1 are connected to a manifold conduit 2 in order that the combined, total, production may be transported to a unitary vessel 3 for distribution to field processing equipment.

The total production is illustrated as divided for distribution among a plurality of treaters 4, as representative of field processing equipment for divided liquid portions. The treaters 4 process this particular liquid collection by breaking the emulsion and separating the production into water and merchantable oil.

It is not practical to use a single treater to handle the total amount of production of manifold conduit 2. The basic problem met by the invention is division of the liquids into predetermined portions, each of which can be handled by one of a battery of treaters. Whether the unlimited production of a single well, or the total production of a number of wells of limited production, is to be distributed, the present invention provides for dividing the processing function among a number of processing units so that a limited group of the units will not be overburdened while the remainder of the units are underburdened.

*Splitter vessel 3*

Figure 2:
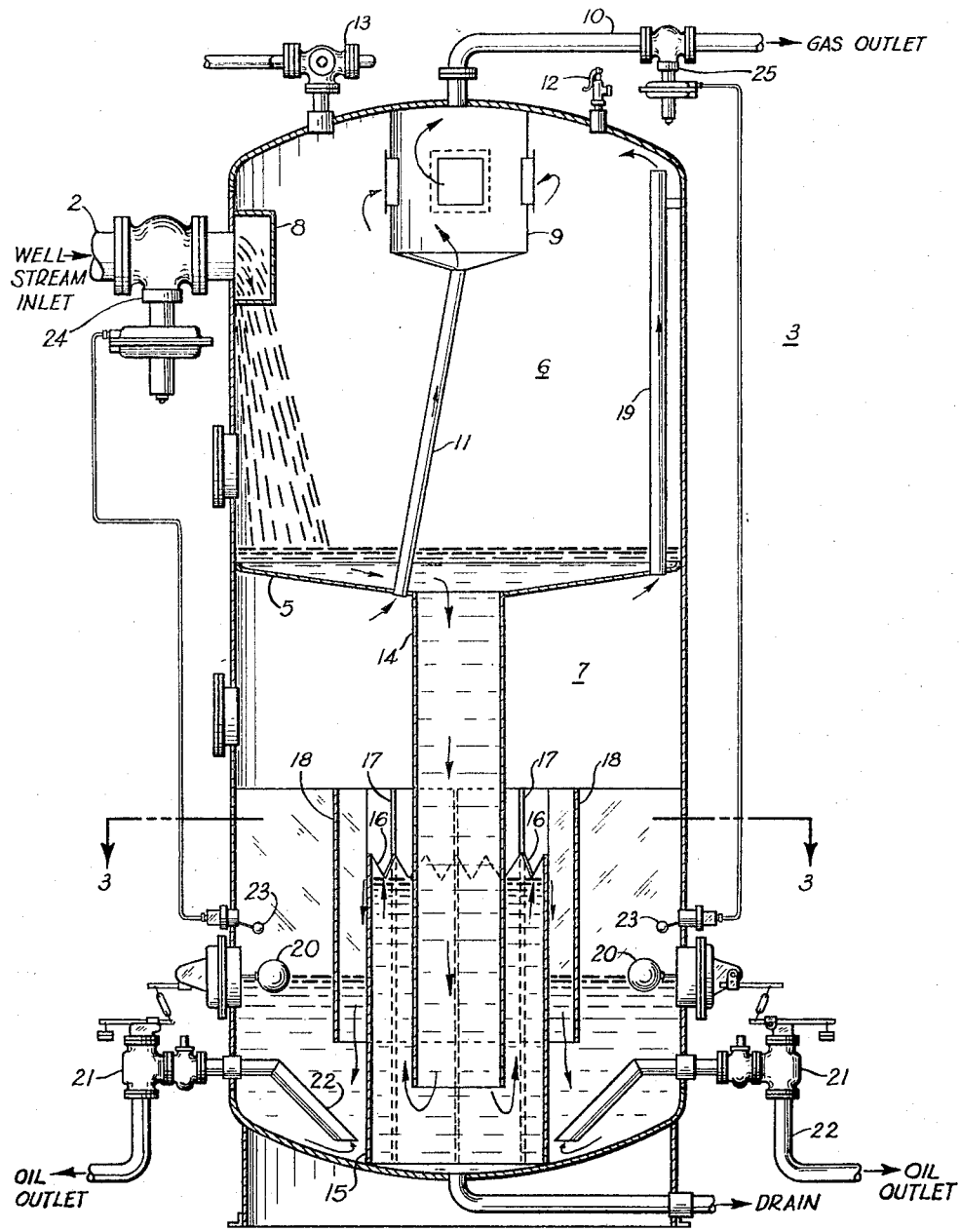
FIG. 2 is a sectioned elevation of a unitary vessel which controls the distribution of liquids in accordance with the invention.
Figure 3:
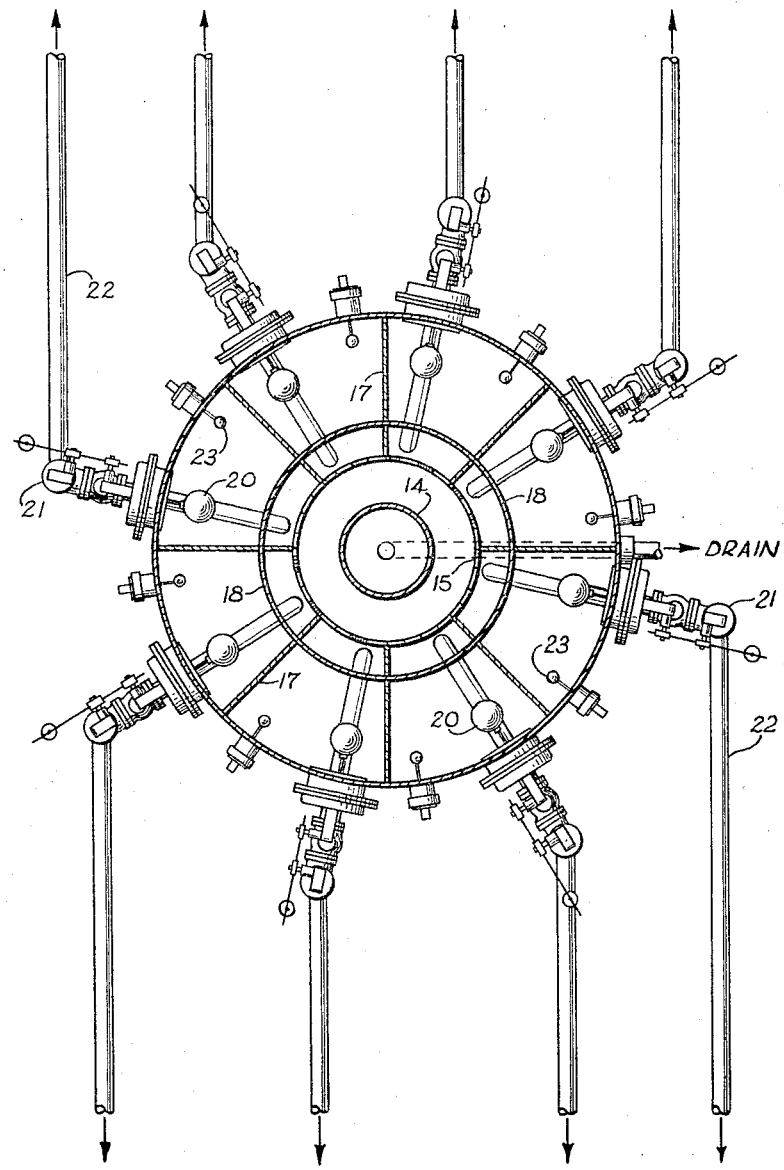
FIG. 3 is a section along lines 3—3 of FIG. 2.

FIGS. 2 and 3 illustrate the internal structure of vessel 3 into which the total production is brought. Within this unitary vessel, the liquid production of manifold conduit 2 is divided, or split, and distributed to treaters 4.

The specific form given vessel 3 is that of a cylindrical shell, its longitudinal axis vertically extended. The upper portion of this shell has a first compartment arranged to function as a gas-liquid separator. From this separation, the liquids are conducted to a point of release near the bottom of the lower portion of the shell. The liquids may be maintained in a homogeneous mixture which then rises to a series of weirs over which the mixture is metered into separate compartments within the vessel. Each collection of a homogeneous mixture of metered liquids is then drawn from the separate compartments to treaters 4.

The liquids conducted to the point of release near the bottom of the lower portion of the shell may also have sufficient residence time to form strata of its phases. Oil may form an upper stratum. Emulsion may form a stratum below the oil. Water may form on the bottom. It is desirable that both the water as well as the oil and emulsion be divided among the treaters to properly load this processing equipment. Therefore, each stratum, in turn, rises to the series of weirs and is divided by flowing over the weirs; a plurality of the upper strata of the liquids are thereby simultaneously divided into the separate compartments.

*Separator section 6*

Transverse baffle 5 divides the vessel 3 into upper separator section, or first compartment, 6 and lower distribution section 7. The manifold conduit 2 brings the total production stream into first compartment 6 and against diverter plate 8. Diverter plate 8 functions to spread the liquids on the walls of vessel 3, in first compartment 6, to reduce the break-out travel of gas from these liquids in which it is entrained.

The gas, broken from the production liquids travels a path into mist extractor 9 and out conduit 10. Any entrained liquids carried into the extractor 9 are drained below baffle 5 by means of conduit 11.

Various safety devices may be used to guard against the gas pressure increasing beyond a predetermined limit in vessel 3. Relief valve 12 and a three-way plug valve 13 with safety heads between its flanges, represent some of the safety devices that may be employed for this purpose.

The liquids collecting above transverse baffle 5 are to be divided, or split, into as many portions as there are treaters provided to process the liquids. The liquids are collected in downcomer conduit 14 and conducted below baffle 5. This conduit 14 extends downwardly, coextensive with the axis of vessel 3, to a release point near the bottom of the divider, or splitter, section 7 beneath baffle 5.

*Splitter, or divider, section 7*

Section 7 may receive the liquids of downcomer 14 as a swirled, thoroughly mixed, collection of the total liquids to be divided into portions, over a wide variation of flow rate down conduit 14. The liquids may also have sufficient residence time to form strata of its oil, emulsion and water phases. In either event, division is accomplished by metering the total liquids into portions over a series of weirs.

FIG. 2 should be considered with FIG. 1 to understand the weir placement within section 7 which carries out their function of the invention. A weir cylinder 15 is extended up from the bottom of the section 7 to form a collecting chamber. This weir cylinder 15 is larger than downcomer 14 depending into it. Weir notches 16 are spaced evenly about the upper lip of cylinder 15.

Baffles 17 are then extended radially from weir cylinder 15 to the internal wall of the vessel 3. These baffles 17 extend above the lip of cylinder 15 a finite distance above each weir formed by the internal edges of baffles 17 and having the notches 16 as its bottom. The portion of the liquids of conduit 14 metered over this weir is discharged into the compartment the baffles 17 form with a portion of the wall of cylinder 15 and the internal wall of vessel 3.

A quieting baffle cylinder 18 is extended down into the compartments, well below the level of the liquids discharged into the compartments. Baffle cylinder 18 is sized larger than weir cylinder 15, to form a vertical passage for the liquids metered over each weir 16 and falling into its compartment, well below the surface of the metered liquids collecting in the compartment.

Cylinders 15 and 18 are open at their upper ends, within section 7. Therefore, all liquid collections in the bottom of section 7 are exposed to a common gas pressure in the upper portion of section 7. Further, equalizer pipe 19 extends through baffle 5 to connect the gas spaces of sections 6 and 7.

A level control in the form of a float 20, and connecting linkage, is indicated in each vessel compartment beneath each weir 16. Each float 20 controls a valve 21 in discharge conduit 22. Each compartment has its collected liquids drawn off through its conduit 22. Each conduit 22 draws off its compartment liquid to a treater 4, representing a processing unit.

Each of floats 20 control their compartment liquid discharge to a predetermined minimum level within their compartments. Upper level floats 23 are also provided in each compartment. These floats are indicated as connected so as to control the input of total liquids to section 6 through manifold conduit 2 and/or gas discharge from conduit 10. Specifically, valve 24 in conduit 2 may be placed under the control of one or more floats 23 to limit the input to vessel 3 and prevent the level of the weir compartments from rising above the upper edges of baffles 17. It may prove practical to have this upper level limit control from only one compartment if the weirs meter equal amounts of liquid into the compartments and the treaters 4 receive equal quantities of the liquids from the compartments.

If an unbalance of withdrawal should develop from the compartments, it might be desired to have a high level monitor in each compartment. This would insure the level of no compartment would exceed the height of its weir and unbalance the equal metering into the compartments by the weirs.

Still, it might be desired to operate vessel 3 so that rising levels in one or more compartments would cause gas discharge valve 25 to start closing. The back pressure in vessel 3 would start increasing and raise this force on the surfaces of the liquid collections. So energized, the liquids would increase in their rate of discharge and lower the level of the liquids.

*Operation*

The function of separator section 6 has been outlined supra. The total production of manifold conduit 2 is diverted upon the walls of this first compartment. Gas broken from the production is taken out conduit 10, through mist extractor 9. Any gases subsequently released from liquids within splitter section 7 are also drawn off through conduit 10 as they come into section 6 through equalizer conduit 19. Any liquids removed from the gas going through extractor 9 are dropped into section 7 by means of conduit 11. The well liquids collected in the bottom of section 6 then flow down conduit 14 for release near the bottom of weir cylinder 15 as a collecting chamber. Well fluids traveling down conduit 14 then rise up the annulus formed between conduit 14 and cylinder 15. The level of collected liquids in this annulus raises uniformly from conduit 14 to the weirs above notches 16 between the edges of radial baffles 17.

By spacing the weirs equidistant from the discharge from conduit 14, there is no level gradient differential from the point of release to each weir. As long as vessel 3 is level, the weirs are supplied uniformly and the liquids are divided over the weirs and into the vessel compartments.

Weir notches 16 are given their specific V-shape to reduce the metering error at low flows due to vessel 3 being off-vertical. Vessels 3 are generally in large, cumbersome, sizes. Leveling the weirs within the vessel, as the vessel is set, is subject to error. At low flow rates of liquid divided, the V-shape of weir lip will tend to minimize the effect of slight vertical height differences between weirs on their dividing, or splitting, function.

The liquids metered over the weirs are conducted into their various vessel compartments by quieting baffle cylinder 18. The liquids from the weir notches are released below the surface of the collection in their compartments, preventing turbulence which would make the response of float 20 to the compartment liquid level erratic.

Each discharge conduit 22 draws liquids from a point well below the surface of the liquids. With a minimum level held by float 20, the collection of liquids in each compartment becomes an effective seal to prevent gas being forced out of the vessel 3 through one or more of the discharge conduits 22.

Control of the several liquid collections from their compartments is a relatively simple matter. Floats 20 control valve 21 readily for this purpose. When one or more conduits 22 plug, or a valve in them is closed, the normal function of the vessel 3 is threatened.

If a single compartment should fill above the level of the other portions being metered, the situation is not too critical. The liquids that would have been discharged from that compartment are fairly evenly divided over the remaining weirs. The float 23 of that particular compartment could sound an individual alarm to operating personnel for corrective action.

The situation becomes more serious if the total liquids coming to vessel 3 through conduit 2 begin to exceed all the capacity of the valves 21 and conduits 22. The levels of all compartments begin to rise. There are generally two corrective actions that may be taken. The gas pressure within vessel 3 may be generally increased or the liquids received into vessel 3 may be cut back. Subjective considerations of each field installation establish what is the desirable mode of operation.

Both approaches to control have been indicated. A float 23 is shown connected to valve 24. A float 23 is shown connected to valve 25. The invention contemplates modulating valve 24 and/or valve 25 from level in section 7 to maintain the weirs functioning to divide what liquids are uniformly related to them.

It is fully appreciated that it may be very undesirable to cut down on the total liquid take by vessel 3. The sources from which the total liquid is made up may be very sensitive to back pressure caused by a general reduction of output with a closure of valve 24. It may be desirable to shut down the wells in some sequence which would cause the least upset in the system.

On the other end of the system, malfunction of an individual processing unit may set off corrective action by its vessel 3 compartment float 23. The signal generated by float 23 may be used to simply communicate or take corrective action automatically. The corrective action could be as simple as closing valve 25 to increase the pressure in vessel 3 to boost the liquids from all compartments with greater force.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A method of separating a mixture of gas and liquids and distributing the liquids among a number of liquid processing units, comprising the steps of;
   flowing the mixture into a closed vessel,
   flowing the mixture through a first portion of the vessel to induce the gas to separate from the liquids,
   flowing the liquids from the first portion to a second portion of the vessel in a quiescent manner to induce the liquids to form a relatively level upper surface,
   passing the liquids in the second portion of the vessel over a plurality of separate weirs and into a plurality of separate compartments,
   communicating and applying the elevated pressure of the separated gas to the vessel portions and separate compartments,
   independently discharging the liquid from each separate compartment to one of the number of liquid processing units while preventing the discharge of separated gas to such units,
   removing excess separated gas from the vessel,
   and controlling the rates of flow of the gaseous and liquid fluids to continuously balance the total fluid inflow to and outflow from the vessel and substantially maintain the flow relationships within the vessel.

2. A method of separating a mixture of gas and liquids and distributing the liquids among a number of liquid processing units, comprising the steps of;
   flowing the mixture into a closed vessel,
   flowing the mixture through a first portion of the vessel to induce the gas to separate from the liquids,
   flowing the liquids from the first portion to a second portion of the vessel in a quiescent manner to induce the liquids to separate into strata and form a relatively level upper surface,
   passing the upper strata of liquids in the second portion of the vessel over a plurality of separate weirs and into a plurality of separate compartments,
   communicating and applying the elevated pressure of the separated gas to the vessel portions and separate compartments,
   independently discharging the liquid from each separate compartment to one of the number of liquid processing units while preventing the discharge of separated gas to such units,
   removing excess separated gas from the vessel,
   and controlling the rates of flow of the gaseous and liquid fluids to continuously balance the total fluid inflow to and outfluow from the vessel and substantially maintain the flow relationships within the vessel.

3. A method of separating a mixture of gas and liquids and distributing the liquids among a number of liquid processing units, comprising the steps of;
   flowing the mixture into a closed vessel,
   flowing the mixture through a first portion of the vessel to induce the gas to separate from the liquids,
   flowing the liquids from the first portion to a second portion of the vessel in a quiescent manner to induce the liquids to form a relatively level upper surface,
   passing the liquids in the second portion of the vessel over a plurality of separate weirs and into a plurality of separate compartments,
   communicating and applying the elevated pressure of the separated gas to the vessel portions and separate compartments,
   independently discharging the liquid from each separate compartment to one of the number of liquid processing units while preventing the discharge of separated gas to such units,
   removing excess separated gas from the vessel,
   controlling the flow of the mixture into the closed vessel to maintain a predetermined maximum height for the liquid in each separate compartment,
   and controlling the rates of flow of the other gaseous and liquid fluids to continuously balance the total fluid inflow to and outflow from the vessel and substantially maintain the flow relationships within the vessel.

4. A method of separating a mixture of gas and liquids and distributing the liquids among a number of liquid processing units, comprising the steps of;

flowing the mixture into a closed vessel, flowing the mixture through a first portion of the vessel to induce the gas to separate from the liquids, flowing the liquids from the first portion to a second portion of the vessel in a quiescent manner to induce the liquids to form a relatively level upper surface, passing the liquids in the second portion of the vessel over a plurality of separate weirs and into a plurality of separate compartments, communicating and applying the elevated pressure of the separated gas to the vessel portions and separate compartments, independently discharging the liquid from each separate compartment to one of the number of liquid processing units while preventing the discharge of separated gas to such units, removing and controlling excess separated gas from the vessel to increase the gas pressure within the vessel as the levels of the liquid in each separate vessel compartment rises, and controlling the rates of flow of the gaseous and liquid fluids to continuously balance the total fluid inflow to and outflow from the vessel and substantially maintain the flow relationships within the vessel.

References Cited by the Examiner

UNITED STATES PATENTS

| | | | |
|---|---|---|---|
| 2,547,794 | 4/1951 | Stone | 137—362 X |
| 2,582,523 | 1/1952 | Beglinger | 137—362 |
| 2,995,201 | 8/1961 | Stafford | 137—193 X |

WILLIAM F. O'DEA, *Primary Examiner.*

ALAN COHAN, ISADOR WEIL, *Examiners.*